(12) United States Patent
Nishkoji et al.

(10) Patent No.: US 7,379,132 B2
(45) Date of Patent: May 27, 2008

(54) LIQUID CRYSTAL DISPLAY AND METHOD FOR DETERMINING THE CONTRAST OF A COLOR LAYER AND POLARIZER PLATE

(75) Inventors: Yuichi Nishkoji, Osaka (JP); Ruei-liang Luo, Taoyuan (TW); Hideki Matsukawa, Osaka (JP)

(73) Assignees: Quanta Display Inc. (TW); Quanta Display Japan Inc., Osaka (JP)

( * ) Notice: Subject to any disclaimer, the term of this patent is extended or adjusted under 35 U.S.C. 154(b) by 415 days.

(21) Appl. No.: 11/259,593

(22) Filed: Oct. 25, 2005

(65) Prior Publication Data

US 2006/0092350 A1 May 4, 2006

(30) Foreign Application Priority Data

Oct. 28, 2004 (JP) ............................. 2004-313654

(51) Int. Cl.
 *G02F 1/1335* (2006.01)
(52) U.S. Cl. .......................................................... 349/96
(58) Field of Classification Search .................. 349/96, 349/97
See application file for complete search history.

(56) References Cited

U.S. PATENT DOCUMENTS

| 4,917,465 | A | * | 4/1990 | Conner et al. ............... 349/5 |
| 5,374,493 | A | * | 12/1994 | Fukunaga et al. ............ 430/7 |
| 7,232,594 | B2 | * | 6/2007 | Miroshin et al. .......... 428/1.31 |
| 2001/0033349 | A1 | * | 10/2001 | Honda et al. ................ 349/96 |

* cited by examiner

*Primary Examiner*—David Nelms
*Assistant Examiner*—John Heyman
(74) *Attorney, Agent, or Firm*—Martine Penilla & Gencarella, LLP

(57) ABSTRACT

A liquid crystal display with high contrast and little color difference between white plain color and black plain color is disclosed, in which in the color layers formed on an optically transparent substrate, the contrasts of red (R), green (G), and blue (B) $CR_R$, $CR_G$, and $CR_B$ have a relationship of $16\times(CR_R/CR_G)-3 > CR_B/CR_G > CR_R/CR_G$, and the total contrast $CR_{R, G, B}$ calculated from the contrasts of color layers $CR_R$, $CR_G$, and $CR_B$ and the contrast of a polarizing plate $CR_{POL}$ satisfy a relationship of $CR_{R, G, B}/CR_{POL} > 0.11$.

7 Claims, 3 Drawing Sheets

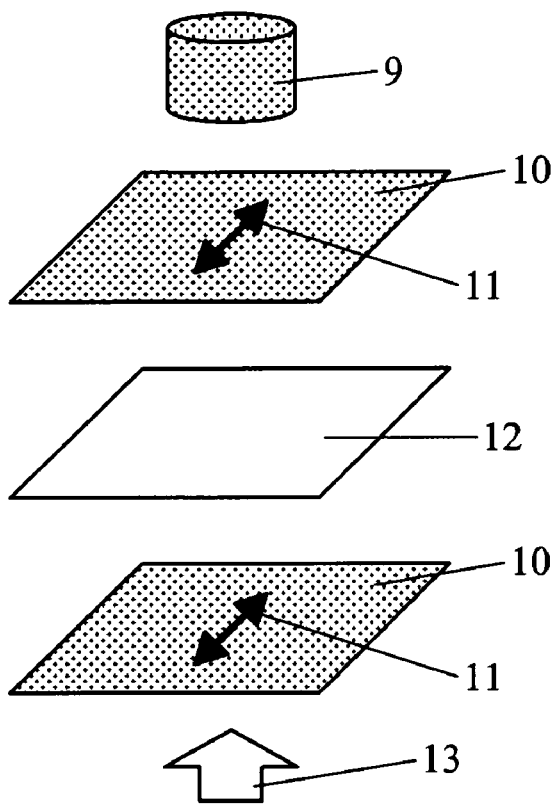
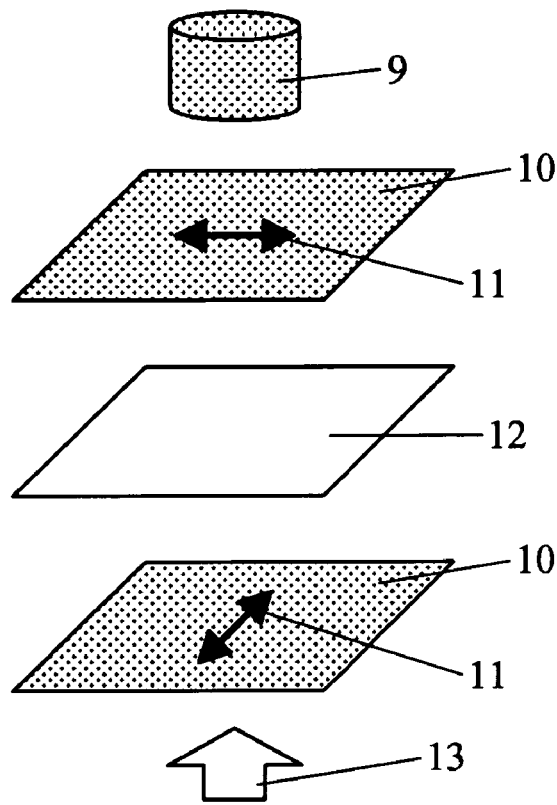
FIG. 3a
FIG. 3b

LIQUID CRYSTAL DISPLAY AND METHOD FOR DETERMINING THE CONTRAST OF A COLOR LAYER AND POLARIZER PLATE

BACKGROUND OF THE INVENTION

1. Field of the Invention

The present invention relates to a liquid crystal display; more particularly, relates to a color display of a liquid crystal display.

2. Description of Related Art

Nowadays, liquid crystal displays (LCDs) have been increasingly broadly applied in TV sets having the requirements for high contrast, wide viewing angle, and high reproducibility of colors. Technologies such as normal black mode or high-contrasted polarizing plate, or decreasing the depolarizing factors in liquid crystal cells can be adopted for the requirement for high contrast. VA mode or IPS mode with a phase-shift film for optical compensation can be employed for the requirement for wide viewing angle. Improvement on color purity of color filters or optimization of backlight spectrum can be utilized for the requirement for high reproducibility of colors.

SUMMARY OF THE INVENTION

Problems to be Solved by the Invention

When displaying colors with different gradations, however, conventional LCDs suffer a problem of image quality reduction due to significant change in color tone. Change in gradation is more significant particularly on the low-key side near black plain color. It is understood from the prior art that this mostly results from the property of the color filter. The method for forming a color filter mainly includes dispersing organic pigments into, for example, acryl resin. In such situation, the scattering extent of incident light varies with the dispersion state of the pigment particles, and degree of depolarization (the extent the polarization is eliminated) varies as well. Therefore, in the case of a large contrast difference between red, green, and blue, even though the color is adjusted based on the color characteristic at the time of white plain color of the panel, color balance breaks down at the time of the black plain color owing to quite different amount of light leakage from each pixel section.

Improved circuit correction technology has been proposed (disclosed in SID03, Digest of Tech. Papers (2003), 344) in order to reduce color variation resulted from the change in gradation. However, the effect on the low-key side near the black plain color therein is still insufficient.

Japanese Laid-Open Publication No. 2004-191428 has disclosed a method of diminishing the contrast of light at a specified wavelength by selectively scattering the component of light at the specified wavelength via color filter so as to suppress the color difference caused by the change in gradation. However, a concern with this method is that the depolarization factor is increased for as a result of scattering within the liquid crystal panel; hence, the contrast of the panel is reduced.

[Reference 1] Japanese Laid-Open Publication No. 2004-191428

In Japanese Laid-Open Publication No. 2004-191428, it discloses that if the largest and the smallest contrast among the contrasts of RGB colors are respectively set as CR1 and CR2, with a relationship of CR1/CR2≦1.6, black plain color is not observed to be colored. However, for example, in the case of Test Material No. 2 (R=1450, G=900, B=1250) illustrated in its embodiments, R/G=1.6 and B/G=1.4, which fails to satisfy the relationship of the present invention as described below. Therefore, it is verified that the black plain color of the resultant LCD is bluish, resulting in a poor image quality.

[Reference 2] Japanese Laid-Open Publication No. 2001-194658

The bluish phenomenon of black plain color is also caused by the orthogonal color of the polarizing plate. Conventional polarizing plates are mainly formed by staining polyvinyl alcohol with iodine. Generally, since the alignment status of iodine on the short-wavelength side is not perfect, the transmissivity is higher on the short-wavelength side of the transmission spectrum of the polarizing plate in an orthogonal condition. Accordingly, when a color filter with a characteristic of lower contrast of blue than that of red or green is used, a bluish black display is presented due to the synergistic effect of the color filter and the blue light leakage caused by the polarizing plate, so in most cases it is impossible to acquire a perfect image quality.

It is an object of the present invention to provide a liquid crystal display having high contrast and an improved color difference between the white plain color and the black plain color such that a high image quality can be achieved.

Technology for Solving Problems

In order to solve the problems mentioned above, the inventors of the present invention propose a liquid crystal display where, on a transparent substrate on which red (R), green (G), and blue (B) color layers are formed, the respective contrasts of red, green and blue color layers $CR_R$, $CR_G$, and $CR_B$ determined via C light source established by the International Commission on Illumination (CIE) have a relationship of $16 \times (CR_R/CR_G) - 3 > CR_B/CR_G > CR_R/CR_G$, and the total contrast $CR_{R, G, B}$ calculated from the contrasts of respective color layers $CR_R$, $CR_G$, and $CR_B$ and the contrast of the polarizing plate satisfy the relationship of $CR_{R, G, B}/CR_{POL} \geq 0.11$.

[Effect of the Invention]

A liquid crystal display with high contrast, little color difference between the white plain color and the black plain color, and great image quality can be provided according to the present invention.

BRIEF DESCRIPTION OF THE DRAWINGS

FIGS. 3(a) and 3(b) are illustrations showing a method for determining contrasts of color layers and polarizing plates.

DETAILED DESCRIPTION OF THE PREFERRED EMBODIMENT

Figure 1:
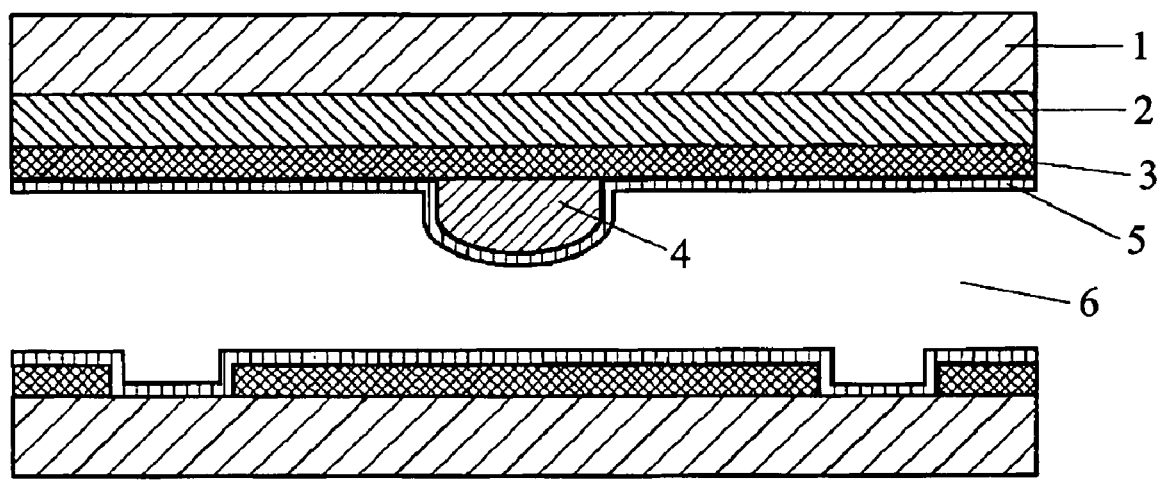
FIG. 1 shows a cross-sectional view of one embodiment of a liquid crystal display structure according to the present invention.

By using C light source established by the International Commission on Illumination (CIE), on a transparent substrate on which red (R), green (G), and blue (B) color layers are formed, the contrasts for respective color layers $CR_R$, $CR_G$, and $CR_B$ preferably have a relationship of $16 \times (CR_R/CR_G) - 3 > CR_B/CR_G > CR_R/CR_G$, and more preferably a relationship of $16 \times (CR_R/CR_G) - 4 > CR_B/CR_G > CR_R/CR_G + 0.2$.

A method for determining the contrast of a color layer is described herein. As shown in FIG. 3(a), a transparent substrate 12 on which a single color layer with uniform thickness is formed is disposed as an object under test between the polarizing plates 10 with the absorption axes 11 arranged in parallel. The brightness determined by a luminometer 9 using C light source 13 is denoted by W(Y), in which Y can be decided from CIE 1391 chromaticity diagram. Also, as shown in FIG. 3(b), the brightness of the transparent substrate disposed between the polarizing plates with the absorption axes vertical to each other is denoted by B(Y). The contrast is determined by W(Y)/B(Y). "The contrast of the polarizing plate" can be determined in the same way using only the polarizing plate when the object under test 12 is not present. On the other hand, by forming each color layer on respective transparent substrates, the total contrast is the ratio of Wtotal to Btotal (Wtotal/Btotal), wherein Wtotal and Btotal represent respectively the sums of W(Y) and B(Y) obtained from the aforementioned method.

The transparent substrate for the present invention is not particularly limited but is preferred to be inorganic glass groups such as quartz glass, boron silicate glass, aluminum silicate glass, and soda lime glass with a silicon dioxide coating on its surface, or organic plastic film or material. In addition, a driving element such as TFT or MIM can also be formed on the transparent substrate prior to the formation of color layers.

Figure 2:
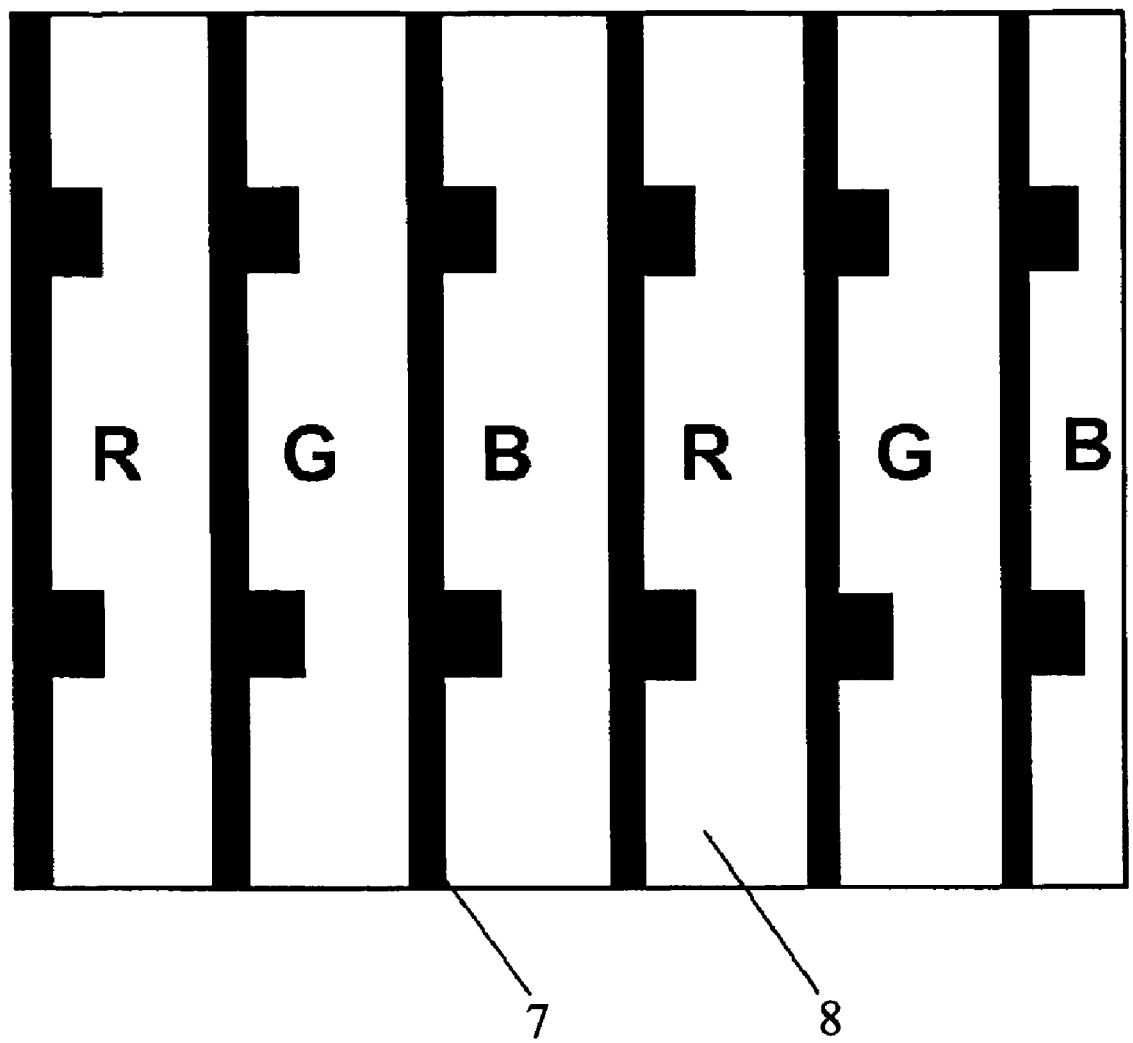
FIG. 2 shows a plan view of one embodiment of a color filter structure.

FIG. 2 shows a plan view of one embodiment of a color filter structure that can be applied to the LCD of the present invention. In the case of color display using additive color process, the color filter is composed of a color layer 8 including three fundamental colors of red (R), blue (B), and green (G) and black matrix 7 for light shielding, while on the other hand, in the case of color display using subtractive color process, cyan (C), magenta (M), and yellow (Y) are selected as the three fundamental colors. Generally, the element including the three fundamental colors is considered as one unit for a pixel for color display. Further, the composition of a white material or a white produced from a transparent material added into the fundamental colors of RGB can be considered as one unit, or the above six colors of RGBCMY can be all considered as one unit for color display.

Generally speaking, for the method of forming a color layer on a transparent substrate, low-cost manufacturing method can be used such as the method of forming coloring portion using printing or inkjet process, in addition to the methods of staining a stainable medium formed by photolithography, using a photosensitive pigment dispersing composition, etching a non-photosensitive pigment dispersing composition, and electroplating with a patterned electrode.

Resin colored with a coloring agent is used in the color layer. For example, organic pigments, inorganic pigments, or dyes are more preferable for the coloring agent used in the color layer. Various additives such as UV adsorption agent, dispersing agent, and leveling agent can be added therein. As for the organic pigment, phthalocyanine series, azilake series, condensation azo series, quinacridone series, anthraquinone series, perylene series, or perinone series is preferred.

Photosensitive or non-photosensitive materials such as epoxy resin, acryl resin, urethane resin, polyester resin, polyimide resin, and polyolefin resin are preferable for the resin used in the color layer. The coloring agent is preferably dispersed or dissolved in such resin in order to color the resin. Photosensitive resins include the types of photodegradable resins, photo-cross-linked resins, and photopolymer resins. Those which include photosensitive composition or photosensitive polyamic acid composition composed of monomers, oligomers or polymers with unsaturated ethylene bond(s) and initiators having free radicals produced by UV light are particularly preferred. Among non-photosensitive resins, various polymers described above that can be used for development are preferred. However, since resin with good heat-resistance is preferred in the processes of preparing a transparent conductive film and manufacturing an LCD, and resin that is resistant to all the organic solvents for the steps is also preferred in the process of manufacturing the LCD, so polyimide resin is more particularly preferred.

The method of dispersing or dissolving the coloring agent for obtaining a color paste is, but not particularly limited, to disperse the resin and the coloring agent in a homogenizer such as a three roll mill, a sand grinder, and a ball mill, following mixing the resin and the coloring agent in a solvent.

Dip coating, roll coating, spin coating, die coating, slit coating, and the method using a wire bar are favorable for the method of color paste coating. Subsequently, heat drying (semi-cure) is performed with an oven or a hot plate. The condition for semi-cure varies with the resin, solvent, and amount of the paste coating. Heating is generally preferred to be performed at 60~200° C. for 1 to 60 minutes.

In the case of non-photosensitive resin, exposure and development are performed after a positive photoresist cladding film is formed on thus obtained color paste cladding film. While in the case of photosensitive resin, exposure and development are performed directly or after an oxygen barrier film is formed. The positive photoresist or the oxygen barrier film is removed first if necessary, followed by heat-drying (real cure). The condition for real cure varies with the resin. In the case of obtaining polyimide resin from a precursor, heating is preferably performed at 200-300° C. for 1-60 minutes. A patterned color layer is thus formed by using the above processes on the transparent substarte on which the black matrix is formed.

The film thickness of each three-fundamental-colors layer is, although not particularly restricted, preferably 0.5-4 ☐m, and more preferably 1-3 ☐m. In the case of smaller thickness of the color layer than 0.5 ☐m, poor alignment occurs easily since the angle of inclination for the color filter surface at the edge of the pattern of the black matrix becomes larger. On the other hand, uniform coating of the color layer is difficult to be achieved when the thickness is more than 4 ☐m. Moreover, the lap width of individual pattern of the color layer over the black matrix is preferably less than 4 ☐m.

A transparent over coat can be formed on the color layer as the case may be. It is preferable to use, for example, epoxy resin, acryl resin, urethane resin, polyester resin, polyimide resin, polyolefin resin or gelatine for the resin of the transparent over coat. However, since resin with good heat-resistance is preferable in the processes of preparing a transparent conductive film and manufacturing an LCD, and resin that is resistant to all the organic solvents for the steps is also preferable in the process of manufacturing the LCD, polyimide resin or acryl resin is more particularly preferable.

Dip coating, roll coating, spin coating, die coating, slit coating, and the method using a wire bar are favorable for the method of coating a transparent over coat. Subsequently, heat drying is performed with an oven or a hot plate while an object thereof is to improve leveling. Vacuum drying or pre-heat-drying (semi-cure) can be performed if necessary. The condition for semi-cure varies with the resin, solvent, and amount of the paste coating. Usually, heating is preferably performed at 60~200° C. for 1 to 60 minutes. The condition for heat-drying varies with the resin more or less. In the case of obtaining polyimide resin from a precursor, heating is preferably performed at 200-300° C. for 1-60 minutes generally.

The thickness of the transparent over coat is preferably 0.05-3.0 □m. In view of reducing the level difference within the pixel, the thicker the film thickness is, the better the effect will be, while uniform coating is harder to achieve. It can also be selected appropriately by taking the combination of the thickness of black matrix and the thickness of the color layer into consideration.

When no voltage is applied, the liquid crystal layer including the anisotropic rod-like liquid crystal molecules with a negative dielectric constant areessentially vertically aligned with respect to the substrate is called VA mode. The liquid crystal cell of VA mode includes some types: (1) a liquid crystal cell of VA mode in a narrow sense where the rod-like liquid crystal molecules are essentially vertically aligned when no voltage is applied, and the rod-like liquid crystal molecules are essentially horizontally aligned when voltage is applied (disclosed in Japanese Laid-Open Publication No. H02-176625 and Japanese Patent Publication No. H07-69536); (2) a liquid crystal cell where the VA mode is modified to be multi-domain type so as to enlarge the viewing angle, which specifically include MVA (disclosed in Japanese Laid-Open Publication No. H11-258605), SUR-VAIVAL (disclosed in Display Monthly, vol. 6, No. 3, p. 14, 1999), PVA (disclosed in Asia Display 98, Proc. of the 18th IDRC (1998), 383), Para-A (presented in LCD/PDP International' 99), and DDVA (disclosed in SID 98, Digest of Tech. Papers, 29 (1998), 838), and so forth; and (3) a liquid crystal cell where the rod-like liquid crystal molecules are essentially vertically aligned when no voltage is applied, and the rod-like liquid crystal molecules are essentially oriented in twisted multi-domain alignment when voltage is applied (n-ASM mode) (disclosed in IWD'98, Proc. of the 5th IDW (1998), 143).

FIG. 1 illustrates the cross-sectional view of one embodiment of a liquid crystal display structure according to the present invention. Liquid crystals 6, which may be in an identical type or different types, are sandwiched in between the color filter substrate and the array substrate together. The color filter substrate, which is a transparent substrate 1 with a color layer 2 formed thereon, further includes a transparent electrode 3, a protrusion 4 with an inclined surface used as a domain constraint using positive or negative photoresist, and a liquid crystal alignment layer 5. On the other hand, the array substrate includes a driving element, a transparent electrode with slits thereon, and a liquid crystal alignment layer.

The present invention is not only applied desirably to the VA mode, but also to other driving modes such as IPS, TN or OCB mode. It is because the conventional problem of gradation change of black plain color in the VA mode as well as in the other modes is mainly attributed to the interaction between the depolarizing plate and the color layer formed by the color filter substrate.

The polarizing film includes iodine type polarizing film and dye type polarizing film or polyene polarizing film using dichroic dye. Polyvinyl alcohol film is generally used for fabricating the iodine type polarizing film and dye type polarizing film. The polarizing plate can be formed by disposing a transparent support as a protective layer on both sides of this polarizing film with adhesive located therebetween. The transparent support can commonly be made of materials such as cellulose ester or synthetic polymer (for example, polycarbonate, polysulfone, polyethersulfone, polyacrylate, polymethacrylate, and norbornene resin).

For the orthogonal color of the polarizing plate, the b value in Hunter Lab color space is preferably below −2, more preferably below −1.5, and most preferably below −1. The orthogonal color can be determined via a spectrophotometer by using C light source in the state that the absorption axes of two polarizing plates are orthogonal to each other.

An optically anisotropic layer for compensating the phase difference of a liquid crystal cell can also be provided on a single side of the polarizing plate. When the in-plane refractive indices are denoted as nx and ny, and the refractive index orthogonal to nx and ny is denoted as nz, the thin anisotropic layer having a relationship of nx>ny≧nz, nx=ny>nz, nx=ny<nz, nx≧nz>ny, or nz>nx>ny in terms of the refractive index can be used. The optically anisotropic layer can be bonded to the polarizing plate with pressure-sensitive adhesive thereinbetween, or can be bonded to the polarizing film directly with adhesive.

The anisotropic layer can commonly be made of materials such as cellulose ester, synthetic polymer (for example, polycarbonate, polysulfone, polyethersulfone, polyacrylate, polymethacrylate, and norbornene resin), polymeric liquid crystal, or polymer liquid crystal.

An anti-glare layer or anti-reflection layer can be applied as well in addition to laminating the anisotropic layer. Furthermore, although the pressure-sensitive adhesive used for laminating the layers is not particularly limited as long as it is optically transparent, acryl resin is preferred.

The above only depicts the summary of embodiments. The contents of the embodiments will be described in more detail as follows.

EMBODIMENTS

Determination of Monochrome Contrast CR

Red, green, and blue pigment dispersing photoresists are coated on the glass substrates respectively by using spin coating, then pre-bake, exposure and post-bake are performed to obtain the monochrome test materials. Chromaticities of Red, green, and blue monochrome test materials are adjusted respectively to (x, y)=(0.65, 0.33), (0.28, 0.59), (0.13, 0.11) with C light source. Four sets of test materials A-D are prepared.

The chromaticity (x, y) and contrast of each test material are determined by using C light source established by International Commission on Illumination (CIE) and BM-5A available from Topcon Corporation. The contrast is determined by the ratio of W(Y), which represents the brightness (Y) while each test material is disposed between the parallel polarizing plates, to B(Y), which represents the brightness (Y) while each test material is disposed between the orthogonal polarizing plates, wherein Y is decided from CIE 1391 chromaticity diagram. Besides, total contrast $CR_{R, G, B}$ can also be calculated from the sum of W(Y) and the sum of B(Y) for all test materials.

The polarizing plates used in the present invention are UHLC2-5618 available from the subsidiary of Optimax in Japan. On the other hand, BM-5A from Topcon Corporation is applied by utilizing the C light source to set the contrast CR0 of the single polarizing plate for 10000, and b value for the orthogonal color thereof is equal to −0.8.

The respective contrasts as well as $CR_R/CR_G$ and $CR_B/CR_G$ for the four sets of test materials are demonstrated in Table 1, where $CR_R$, $CR_G$, and $CR_B$ represent the contrasts of red, green, and blue color layers respectively. Also, whether the following relationships are satisfied for each set are summarized in Table 2, where $CR_{R, G, B}$ and $CR_{POL}$ represent respectively the total contrast calculated from $CR_R$, $CR_G$, and $CR_B$ and the contrast of the polarizing plate.

$$16 \times (CR_R/CR_G) - 3 > CR_B/CR_G > CR_R/CR_G \qquad \text{Relationship 1:}$$

$$16 \times (CR_R/CR_G) - 4 > CR_B/CR_G > CR_R/CR_G + 0.2 \qquad \text{Relationship 2:}$$

$$CR_{R, G, B}/CR_{POL} > 0.11 \qquad \text{Relationship 3:}$$

TABLE 1

Results of contrast determination

| Test Material | $CR_R$ | $CR_G$ | $CR_B$ | $CR_{R, G, B}$ | $CR_R/CR_G$ | $CR_B/CR_G$ |
|---|---|---|---|---|---|---|
| A | 795 | 2300 | 2850 | 1720 | 0.35 | 1.24 |
| B | 675 | 2375 | 1835 | 1380 | 0.28 | 0.77 |
| C | 620 | 1300 | 800 | 1030 | 0.48 | 0.69 |
| D | 550 | 3700 | 860 | 1510 | 0.15 | 0.23 |

TABLE 2

Determination obtained by Relationships

| Test Material | Satisfies Relationship 1? | Satisfies Relationship 2? | Satisfies Relationship 3? |
|---|---|---|---|
| A | ○ | ○ | ○ |
| B | ○ | X | ○ |
| C | ○ | X | X |
| D | X | X | ○ |

Preparation of Liquid Crystal Panel

A black matrix pattern is formed on a glass substrate by using black pigment dispersing photoresist. Then the pigment dispersing photoresists are, in the order of red, green and blue, coated, pre-baked, exposed, etched, and post-baked with spin coating repeatedly. An ITO film with a thickness of about 1500 Å is further formed by sputtering, and a protrusion with a height of about 1.5 μm and a width of about 10 μm as well as a photo spacer with a height of about 3.5 μm for domain constraint is formed by using a positive photoresist. Polyimdie alignment layer with a thickness of about 1000 Å is formed. Color filter substrates for test materials A-D are completed in this way. Liquid crystal cells for test materials A-D are prepared by inserting anisotropic liquid crystals with a negative dielectric constant into the region between the current substrate and the opposite substrate having TFT. It is noted that the liquid crystals of different types can be used together as a liquid crystal layer, as mentioned above.

The polarizing plate and the phase difference plate formed by stretching norbornene film are bonded together through an acryl adhesive so that the absorption axis of the polarizing plate is perpendicular to the phase lag axis (in nx direction) of the phase difference plate. A composite optical film is thus obtained. Still, phase difference value is detected by using KOBRA-21ADH available from Oji Scientific Instruments Corporation. Such composite optical films are bonded on both sides of the liquid crystal cell so that the absorption axes of the polarizing plates are perpendicular to one another. The liquid crystal panels for test materials A-D are thus prepared. In addition, the color temperature of white display for each panel is adjusted to around 10000 K by using backlight.

Evaluation of Liquid Crystal Panel

The color difference and contrast between white plain color and black plain color of the finished liquid crystal panel are determined by BM-5A available from Topcon Corporation. If the chromatic scales of white display shown on the CIE 1960 chromaticity coordinates are denoted as (u(w), v(w)), and those of black plain color are denoted as (u(b), v(b)), a display panel with better image quality is obtained when the color difference $\Delta uv = [(u(w)-u(b))^2 + (v(w)-v(b))^2]^{0.5}$ is smaller than 0.04. The results of color difference Δuv and contrast of the panel with respect to the test materials are listed in Table 3. In the case of test material A, a panel with an extremely high contrast and an extremely small color difference can be obtained. In the case of test material B, a panel with good image quality can also be obtained in spite of some magentish black. In the case of test material C, a panel with acceptable image quality and a small color difference is derived, in which bluish black plain color can be observed due to low contrast. However, in the case of test material D, a panel with poor image quality, i.e. a significant color difference, is obtained.

TABLE 3

Color differences and contrasts of panels

| Test Material | Color Difference Δuv | Contrast of Panel | Visual Evaluation (Gradation of black display) |
|---|---|---|---|
| A | 0.023 | 760 | ◉ (good) |
| B | 0.034 | 600 | ○ (slightly magentish) |
| C | 0.036 | 440 | ○ (somewhat bluish) |
| D | 0.052 | 630 | X (magentish) |

What is claimed is:

1. A liquid crystal display comprising:

a transparent substrate;

a polarizing plate attached to the transparent substrate; and a red color layer, a green color layer and a blue color layer formed on the transparent substrate;

wherein contrast of the red color layer ($CR_R$), contrast of green color layer ($CR_G$), contrast of the blue color layer ($CR_B$) and contrast of the polarizing plate ($CR_{POL}$) measured via a C light source, and total contrast calculated from the red, the green and the blue color layers ($CR_{R, G, B}$) satisfy the following formulas:

$$16 \times (CR_R/CR_G) - 3 > CR_B/CR_G > CR_R/CR_G, \text{ and} \qquad (1)$$

$$CR_{R, G, B}/CR_{POL} > 0.11 \qquad (2).$$

2. The liquid crystal display as claimed in claim 1, wherein the polarizing plate has a b value of an orthogonal color in Hunter Lab color space below −2.

3. The liquid crystal display as claimed in claim 2, wherein the polarizing plate has a color difference $\Delta uv = [(u(w)-u(b))^2 + (v(w)-v(b))^2]^{0.5}$ smaller than 0.04, where (u(w), v(w)) and (u(b), v(b)) represent respectively the gradation of white display and the gradation of black display in CIE 1960 chromaticity coordinates.

4. The liquid crystal display as claimed in claim 1, further comprising an opposite substrate and anisotropic liquid crystals inserted between the transparent substrate and the opposite substrate, wherein the anisotropic liquid crystals are essentially vertically aligned when no voltage is applied.

5. The liquid crystal display as claimed in claim 4, wherein at least one of the transparent substrate and the opposite substrate is provided with a protrusion.

6. The liquid crystal display as claimed in claim 4, wherein the anisotropic liquid crystals comprises different types of liquid crystals.

7. The liquid crystal display as claimed in claim 5, wherein the anisotropic liquid crystals comprises different types of liquid crystals.

* * * * *